J. MACKINTIRE.
Beer Cooler.
No. 15,662.
Patented Sept. 2, 1856.
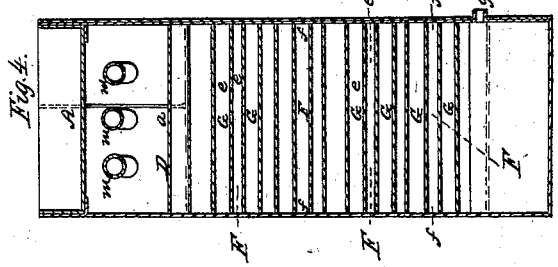
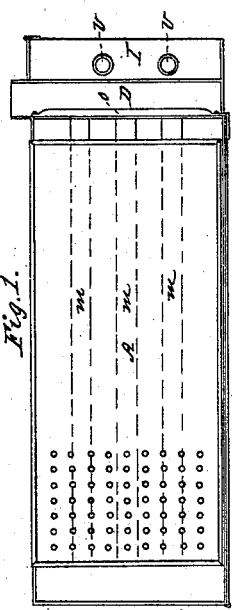
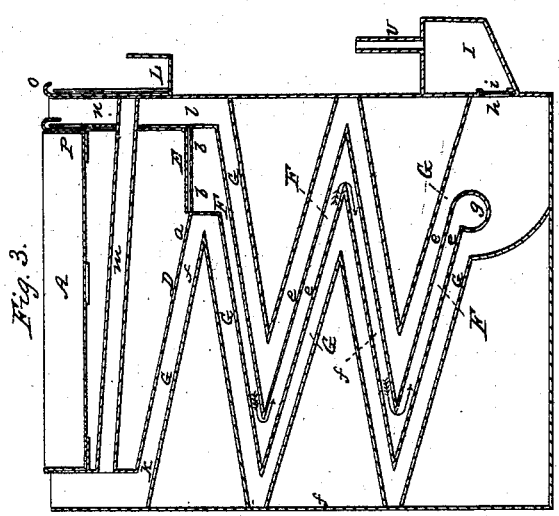
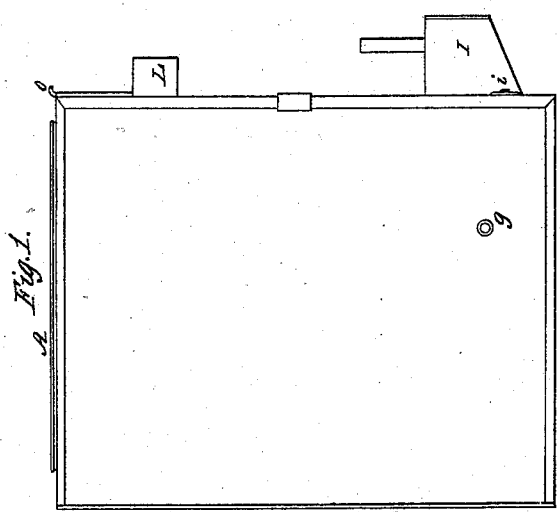

UNITED STATES PATENT OFFICE.

JAMES MACKINTIRE, OF SOMERVILLE, MASSACHUSETTS.

ALE AND BEER COOLER.

Specification of Letters Patent No. 15,662, dated September 2, 1856.

*To all whom it may concern:*

Be it known that I, JAMES MACKINTIRE, of Somerville, in the county of Middlesex and State of Massachusetts, have invented a new and useful Apparatus for Cooling Ale or a Liquid While in a Heated State; and I do hereby declare that the same is fully described and represented in the following specification and the accompanying drawings, of which—

Figure 1, is a top view; Fig. 2, is a side elevation; Fig. 3, a longitudinal and vertical section, and Fig. 4, a transverse, and vertical section of my said apparatus.

In making the within described invention, the particular object I have had in view, has been to produce a cheap and efficient means of cooling large quantities of ale or beer after the brewing of the same has been completed.

It is well known that in the manufacture of ale, it often requires a very long time for a large vat or cistern of it to become cool preparatory to the liquid being drawn from such vat; the cooling of a vat sometimes requiring twenty hours.

In constructing my invention, I make use of a large shallow pan or vessel, A, having its bottom perforated with holes like a strainer, the said vessel being arranged in the upper part of another, viz, D, as seen in the drawing. The bottom, $a$, of said vessel, D, is to be somewhat inclined with respect to a horizontal plane, and near its lower end it is perforated with one or more holes as shown at $b, b$, which are to be covered by a sliding gate, E, by which said holes may be more or less uncovered as circumstances may require. Connected with the vessel, D, and so as to open out of it by the said holes, $b, b$, is a thin zigzag or serpentine channel, vessel or pipe, F, which is made of metallic plates, $e, e$, and so as to present broad surfaces on the upper and lower sides of said plates, they (the plates) being joined at their ends to others, viz, $f, f$, the whole forming the vessel or channel, F, composed of several thin boxes, each of which makes an acute angle with that next to it and opens directly into it, as seen in Fig. 3. The lower box has an exit pipe, $g$, leading from its lower part. Surrounding the zigzag channel or vessel, F, and on its opposite sides or upper and lower surfaces is a zigzag or serpentine water channel or space, G, arranged as shown in Figs. 3, and 4, such chamber at its end being made to communicate with a receiver or vessel I, arranged as seen in Figs. 2 and 3, and provided with one or more holes of communication, $h, h$, and with a sliding gate, $i$, by which said hole or holes may be either closed or partially opened as occasion may require, such holes serving as means of communication between the channel, G, and the receiver, I.

Both branches, $k, l$, of the passage, G, communicate with a discharging spout, L, arranged as seen in Figs. 1, 2, and 3, the branch, $k$, having pipes, $m, m$, extending entirely through the vessel, D, and opening into the said spout, L, such pipes being shown in Figs. 3 and 4. The branch, $l$, of the channel, G, opens into the discharging spout, by one or more holes, $n$, the same being provided with a gate, $o$, by which they and the discharging ends of the pipes, $m, m$, may be closed when necessary. There is also arranged above the holes, $n, n$, and through the contiguous end of the vessel, D, one or more holes, P, as seen in Fig. 3.

If when the apparatus is so made, we suffer hot ale or other liquid to flow into the strainer or pan, A, and we so connect the vessel, I, with a reservoir of water or a forcing pump by one or more pipes, U, that cool water may be made to pass into said vessel, I, and flow into and upward through the space, G, and from thence into the spout, L, the following effects will be produced: The ale or hot liquid will course downward and through the zigzag channel or passage F, and be discharged out of the escape pipe, $g$, at the bottom thereof. The cold water will flow upward through the passage, G, and by contact with the sides thereof will abstract heat from the liquid and so as to cool the same. The cool water first courses into contact with the lower part of the outside surface of the vessel, F, and by the time it has reached the discharging spout it will have been heated, while the ale that started in a heated state at the upper part of the vessel, F, will have become cooled by the time it has reached the lower end of the passage, F. Furthermore, there results from the peculiar zigzag form of the two passages F, and G, another important effect in the action of the cooling liquid flowing through the passage G, for as it passes directly over and against any one of the under surfaces or plates or boxes of the inclined parts of the portion, F, the heat abstracted from such part will remain in the upper parts of the moving column of water, and so that when the current is reversed or flows over the top surface of the next box, the hotter particles of water will be at the uppermost part of the current, while the colder particles will be flowing in direct contact with such top surface. Consequently, in such a way the abstraction of heat is facilitated by the zigzag form of the passages, F and G. Besides this, as the ale passes in to and out of the vertices of the angular bends or flexures of the passage, F, it will be so thrown into commotion as to greatly aid the escape of heat. Other advantages result from the serpentine or zigzag form of the cooler.

By closing the gate, o, to the pipes m m and the opening, n, of the branch, l, of the passage, G, water may be caused to flow into the vessel, D, and from thence it will flow down through the passage, F, and may thus be employed for scouring out the same. Owing to the position of the holes which conduct the water into the vessel, D, (that is relatively to those by which water is discharged into the spout, L,) it will not flow into said vessel while the gate, o, is open.

With an apparatus not only constructed to operate on the principle above specified, but extended so that the bends of the passages, F, and G, shall be increased in number to the extent required, ale during its manufacture in a brewery may be cooled to great advantage and with much despatch and saving of expense in comparison to the common process of cooling in vats. I could further remark that my peculiar arrangement of the chamber, D, the branches, k, and l, and the pipes, m, with reference to one another and the zigzag chambers F, and G, renders such a construction of the apparatus valuable and effective in many respects, such being the main or principal improvement as made by me over other kinds of refrigeating apparatus, wherein the wort or ale is cooled in a channel, running in contact with a channel of water or other liquid, and whether said channels be of a serpentine or other form.

I do not claim constructing an ale or liquid cooler, so that the heated liquid while descending in a channel between plates shall be cooled by cooler currents of water or liquid made to flow in a contrary direction against the outer surfaces of said plates or channel as described. Nor do I claim arranging the water and ale channels in a zigzag serpentine or equivalent manner with respect to one another as described and so as to produce an effect as stated. But What I do claim is—

The combination of the passages, p, n, and gate, o, with the ale and water chambers, pipes, m, m, and zigzag passages, the same being for the purpose or to accomplish results as herein before set forth.

In testimony whereof, I have hereunto set my signature this twenty eighth day of May A. D. 1856.

JAMES MACKINTIRE.

Witnesses:
 R. H. Eddy,
 F. P. Hale, Jr.